W. L. MIGGETT.
TRANSMISSION GEARING.
APPLICATION FILED AUG. 22, 1910.

1,010,166.

Patented Nov. 28, 1911.

3 SHEETS—SHEET 1.

W. L. MIGGETT.
TRANSMISSION GEARING.
APPLICATION FILED AUG. 22, 1910.

1,010,166.

Patented Nov. 28, 1911.

3 SHEETS—SHEET 2.

Witnesses
C. C. Jennings
Lotta Lee Bray.

Inventor
William L. Miggett
By Parker & Burton
Attorneys

COLUMBIA PLANOGRAPH CO., WASHINGTON, D. C.

W. L. MIGGETT.
TRANSMISSION GEARING.
APPLICATION FILED AUG. 22, 1910.
1,010,166.
Patented Nov. 28, 1911.
3 SHEETS—SHEET 3.
Fig. 5.
Fig. 6.
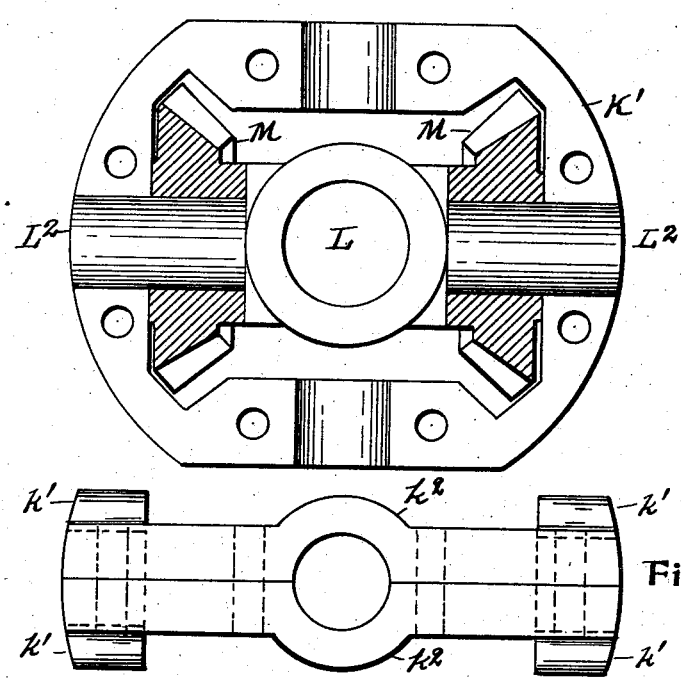
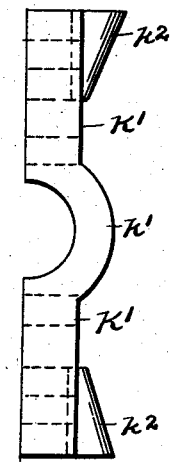
Fig. 6A.
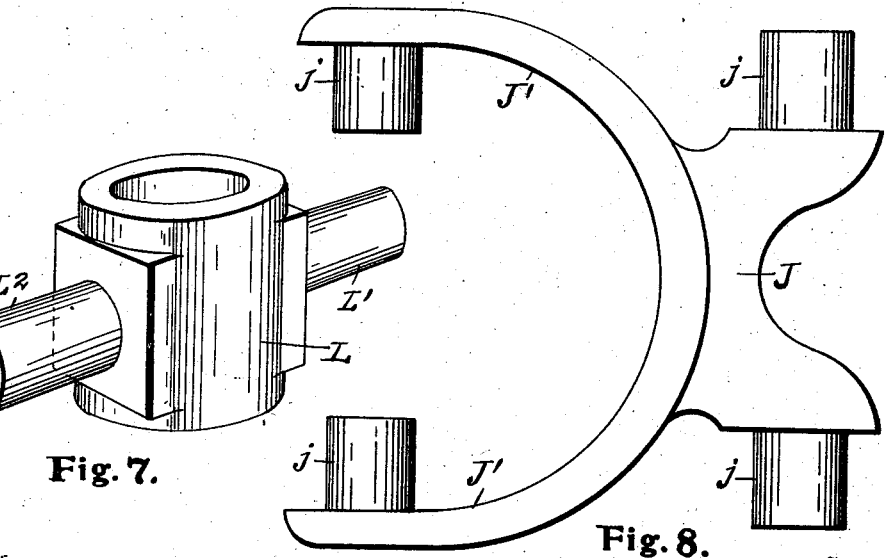
Fig. 7.
Fig. 8.
Witnesses
C. C. Jennings
Lotta Lee Bray.
Inventor
William L. Miggett
By Parker & Burton
Attorneys

UNITED STATES PATENT OFFICE.

WILLIAM L. MIGGETT, OF ANN ARBOR, MICHIGAN.

TRANSMISSION-GEARING.

1,010,166.  Specification of Letters Patent.  Patented Nov. 28, 1911.

Application filed August 22, 1910. Serial No. 578,311.

*To all whom it may concern:*

Be it known that I, WILLIAM L. MIGGETT, a citizen of the United States, residing at Ann Arbor, county of Washtenaw, State of Michigan, have invented a certain new and useful Improvement in Transmission-Gearing, and declare the following to be a full, clear, and exact description of the same, such as will enable others skilled in the art to which it pertains to make and use the same, reference being had to the accompanying drawings, which form a part of this specification.

My invention relates to transmission gearing for automobiles, and a special object of my improvements is to provide an improved construction joining the motor shaft and the transmission shaft, or shafts of an automobile and the casings therefor. I secure this object in the device illustrated in the accompanying drawings, in which:—

Figure 1:
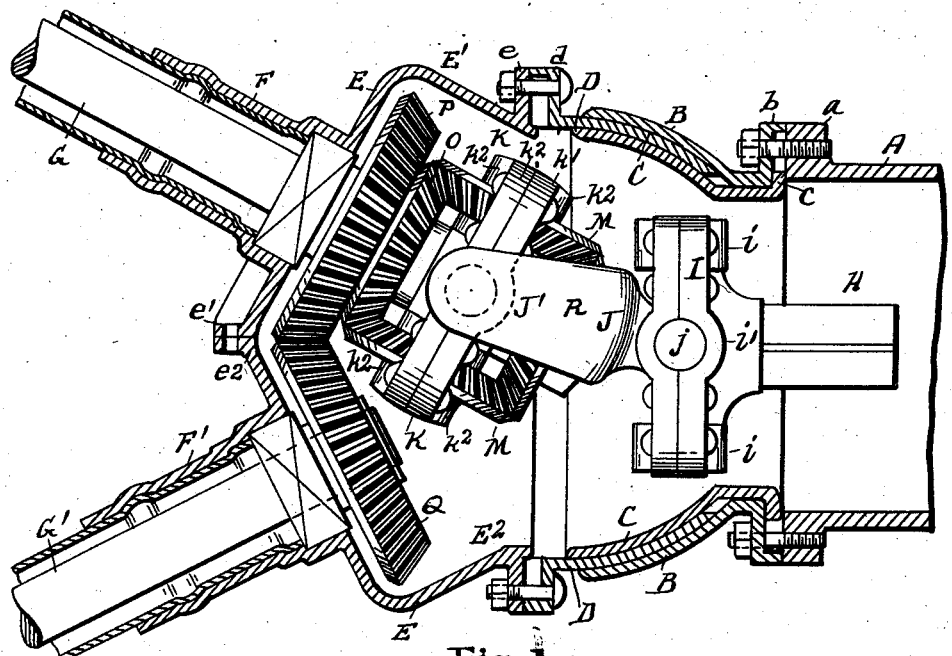
Figure 2:
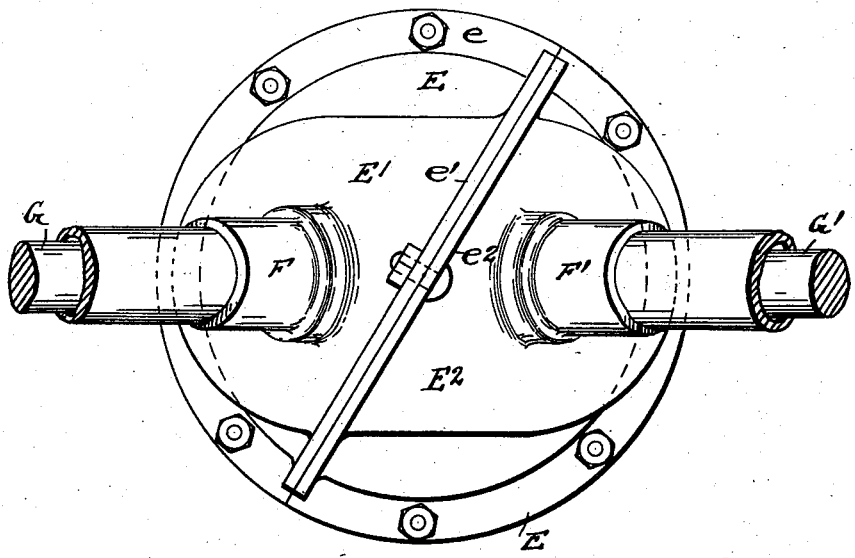
Figure 3:
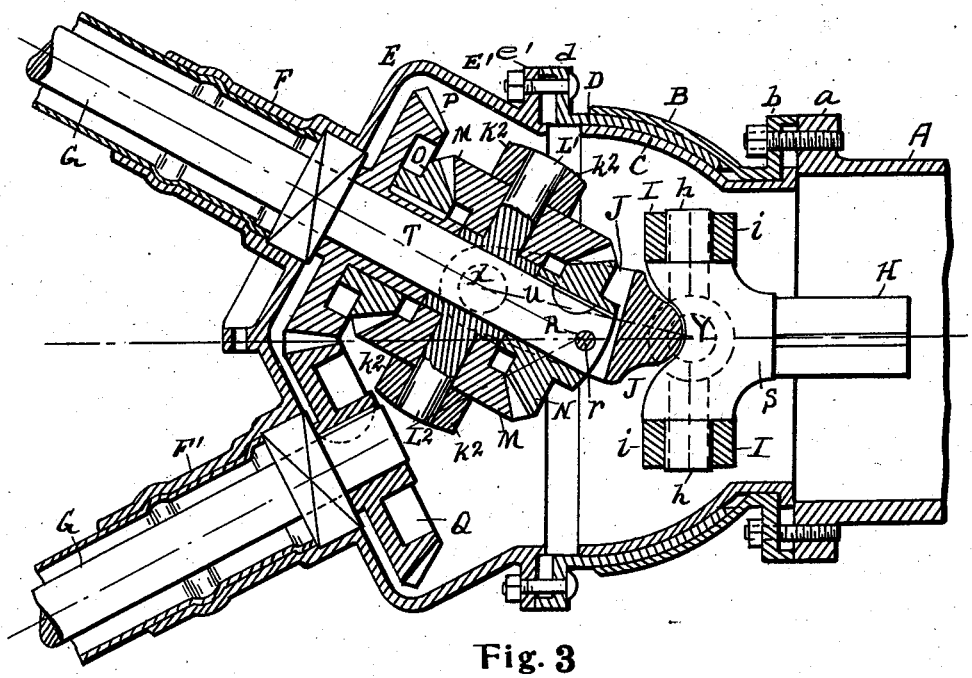
Figure 4:
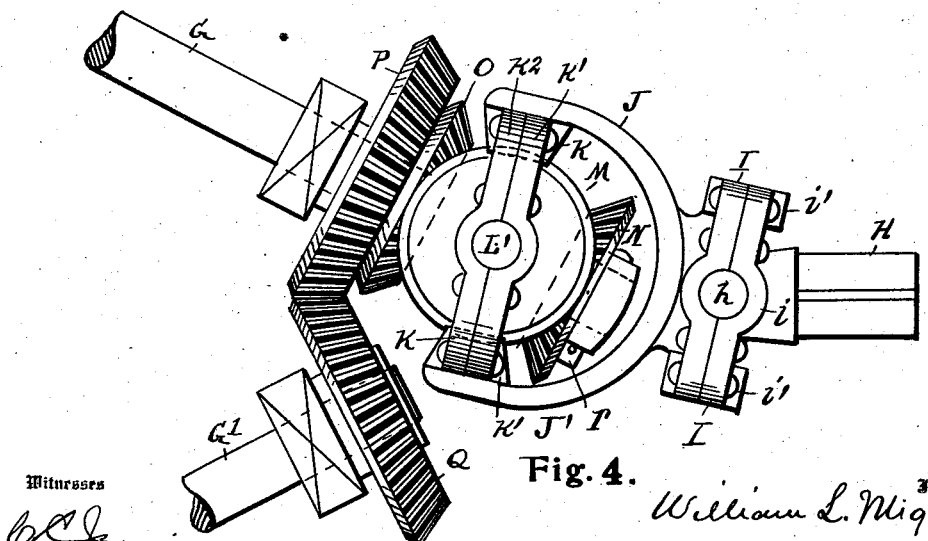

Figure 1, shows a plan view of a mechanism embodying my invention with the casings therefor in section. Fig. 2, is an elevation of the apparatus shown in Fig. 1, looking from the left of said figure, the casing, however, being entire in this figure. Fig. 3, is a view similar to Fig. 1, the mechanism being shown in section. Fig. 4, is a plan view of the mechanism of Fig. 1, without the casings, the fork J and attached mechanism, being turned about 90 degrees from the position shown in Fig. 1. Fig. 5, is a detail view of one of the halves of the ring connecting the joints of the equalizing-gearing and adjacent parts, the bevel gear wheels being shown in section. Fig. 6, is a side elevation of the portion of the ring shown in Fig. 5 looking from the right of said figure. Fig. 6$^a$, is a view of the completed ring uniting the joints of the equalizing-gearing, looking from below the position indicated by the portion shown in Fig. 5. Fig. 7, is a perspective view of the sleeve which carries the driving beveled-gear wheels of the equalizing-gearing. Fig. 8, is an elevation of the fork which unites the driving shaft and equalizing-gearing.

A is a casing inclosing the driving shaft H.

B is a shell formed into the shape of a zone and provided with a flange $b$ by which it is bolted to the flange $a$ on the casing A. The flange $b$ is so formed as shown in Figs. 1 and 3 so as to leave a space between it and the flange $a$.

C is a shell formed into the shape of a zone placed concentric to the shell B and united thereto in any convenient way, the way I have indicated is that it should be spun so at to turn a flange $c$ up around the shell B extending between the flanges $a$ and $b$, and clamped by the joint between the shells A and B. The shell C is of less radius than the shell B so as to leave a space between said shells.

D is a shell formed in the shape of a zone, which shell is held between the spherical surfaces of the shells B and C as indicated in Figs. 1 and 3. The shell D is concentric with the shells B and C, the centers of said shells being at the point marked R in the figures.

E is a casing made up of two halves E$^1$ and E$^2$, which halves are united by slanting flanges $e^1$ and $e^2$, and are united to the shell D by a flange $e$.

F, F$^1$ are cylindrical extensions from the casing E, which form casings for transmission shafts G and G$^1$.

H is a part adapted to be united directly to the motor shaft, or it may be the motor shaft itself. In this case the part H is represented as a squared rod adapted to fit into a socket which may be formed in the transmission shaft which is not shown. The rod H is provided with pintles $h$, $h$, (Fig. 3) which extend at right angles from the end of said rod.

I is a ring formed in two parts provided with sockets $i$, $i$, adapted to embrace the pintles $h$, $h$.

J is a link provided with pintles $j$, $j$, extending at right angles from one end thereof. The ring I is provided with sockets $i^1$, $i^1$, at 90 degrees to the sockets $i$, $i$. The sockets $i^1$, $i^1$ embrace the pintles $j$, $j$.

J$^1$, J$^1$ are two forks forming part of the link J. Each of said forks is provided with a pintle $j^1$ extending inwardly.

K (Fig. 1) is a ring uniting the joints of the equalizing-gearing. The ring K is made up of two parts K$^1$, K$^2$, which are put together to form sockets $k^1$, $k^2$ to engage, respectively the pintles $j^1$, $j^1$ of the link J, and pintles L$^1$, L$^2$ of a sleeve L, upon the shaft G. M, M, are driving bevel-gear wheels of the equalizing-gearing. Said gear wheels are pivoted upon the pintles L$^1$, L$^2$ of the sleeve L inside of the sockets K$^2$ of the ring K. N is a bevel-gear wheel keyed upon the shaft G. O, P, are bevel-gear wheels formed integral with each other and sleeved so as to turn upon the shaft G. The gear wheels M, M, engage the bevel-gear wheels N and O, as shown in Figs. 1, 3 and 4. Q is a bevel-gear wheel upon the shaft $G^1$, the teeth of which engage the teeth of the gear wheel P. By this construction the shafts G and $G^1$ may be placed parallel or at any convenient angle to each other.

The shaft or rod H is so located that its center line S will pass through the centers of the shells B, C, and D at R. The shaft G is so located that its center line T will pass through said center R. The axes of the pintles $I^1$, $I^1$, and $j^1$, $j^1$, produced will intersect in a point X on the axis of the shaft G, and the axes of the pintles $h$, $h$, and $j$, $j$, produced will intersect in a point Y on the axis of the rod H. A line U between X and Y will form the center line of the link J and will always have equal angles with the center lines of the shaft G and rod H. The distance from X to R is equal to the distance from Y to R.

By placing all of the spherical parts of the casing forming the ball joint upon one side of the common center of the spherical surfaces a special form of casing may be provided to correspond to the mechanism so that the casing may be made much smaller and more compact.

By the above construction a uniform motion is transmitted from the rod H to the shaft G through the double universal joint, and the parts are free to turn about the center R.

The parts $E^1$, $E^2$ of the casing E are united by the flanges $e^1$, $e^2$ extending slantingly across said casing so that the parts of the casing may be separated by the vertical movement without interfering with the inclosed mechanism.

What I claim is:—

1. In an apparatus of the kind described, a driving part and a driven part having their axes intersecting, a portion of a universal joint on each of said parts, a link uniting said universal joint portions so as to always form equal angles with said axes, and a pivoted casing inclosing said joint adapted to turn about the intersecting point of said center lines.

2. In an apparatus of the kind described, a driving part and a driven part having their lines intersecting, a portion of a universal joint on each of said parts, a link uniting said universal joint portions so as to form equal angles with the axial lines of said parts, and a pivoted casing inclosing said joint so constructed as to have a universal movement about said intersecting point.

3. A casing for gearing of the kind described, consisting in part of a ball and socket joint, the parts constituting said joint being upon one side of said casing, the other part of said casing being separable from the first named part and shaped to said gearing.

4. In an apparatus of the kind described, a driving part and a driven part having their axes intersecting, a portion of a universal joint on each of said parts, a link uniting said universal joint portions so as to always form equal angles with said axes, and a casing inclosing said mechanism forming in part a ball and socket joint adapted to turn about said intersecting point.

5. In an apparatus of the kind described, a driving part and a driven part, a portion of a universal joint on each of said parts, a link uniting said universal joint portions, said shafts being so located that their axes shall intersect at a point equidistant between the central points of said joints, and means for constraining said shafts to turn about said intermediate point.

6. The combination of an equalizing gearing, a universal joint, and a part forming a portion of said universal joint uniting the pivots of the equalizing gearing.

In testimony whereof, I sign this specification in the presence of two witnesses.

WILLIAM L. MIGGETT.

Witnesses:
LOTTA LEE BRAY,
ELLIOTT J. STODDARD.

Copies of this patent may be obtained for five cents each, by addressing the "Commissioner of Patents, Washington, D. C."